UNITED STATES PATENT OFFICE.

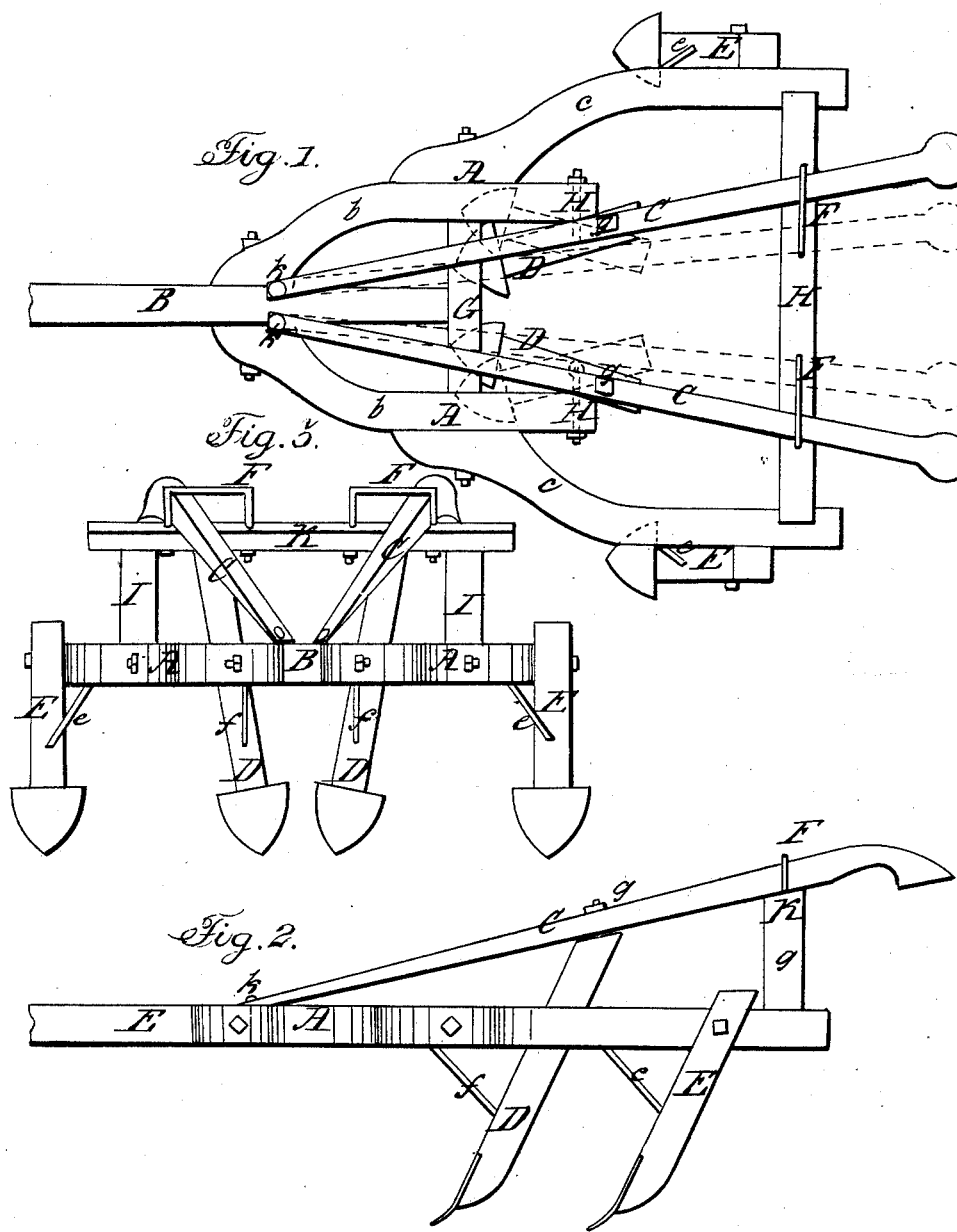

CYRUS DEBOLT, OF OTTAWA, ILLINOIS.

IMPROVEMENT IN CULTIVATORS.

Specification forming part of Letters Patent No. 30,302, dated October 9, 1860.

*To all whom it may concern:*

Be it known that I, CYRUS DEBOLT, of Ottawa, La Salle county, and State of Illinois, have invented certain Improved Corn Plow or Cultivator; and I do hereby declare that the following is a full and exact description thereof, reference being had to the accompanying drawings, making a part of this specification.

Figure 1 is a top view of the frame of the machine containing my improvement. Fig. 2 is a view of a side elevation of it, and Fig. 3 is a view of the same from in front at a point parallel with the extension of the tongue thereof.

My improvement consists in providing the means by which in a corn plow or cultivator, part of the shovels or plows of which may cultivate one side of a row of grain and the other part the other side, to vary the line of the furrow of the two inner plows, and thereby to avoid the danger that would exist, if no such means were provided, of cutting up or otherwise injuring the hills of the row of corn or other product over which the cultivator should pass, and yet leave the machine in such a condition as would adapt it to plowing altogether between any two rows.

That others skilled in the art may make and use my invention, I proceed to state its manner of construction and principle of operation.

Fig. 1 represents the form of the frame of the machine, with its tongue B, its two series of side pieces, $b\ b$ and $c\ c$, with its cross-pieces G and H and its handles C C. The side pieces, it will be observed, are in the shape of the hounds in an ordinary wagon, and those marked $b\ b$ are bolted at their front ends to the tongue B, and at A those marked $c\ c$ are fastened to the pieces $b\ b$ by the cross-piece G and screw-bolts, as shown in the figure; and the pieces $c c$ are firmly held in position by the cross-piece H framed into them. The handles are held at their front end by staples, which permit their free lateral movement. Two short posts are framed into the cross-piece H, and on them is framed another piece running parallel with H, and at a distance of from eight to twelve inches from it, and it is marked K, Fig. 2, and the posts are marked I in the same figure. On the piece K are two brackets or staples, like those represented at F F, Fig. 1, in which the handles of the machine are, and in which they may be moved to the right or left, as is hereinafter set forth.

At H, at the rear ends of the pieces $b\ b$, are attached uprights D, each of which is provided with a plow or cultivator blade, and said uprights are so fastened as to permit a free lateral movement of the plows upon them, respectively, by the use of the following devices—that is to say, the bolts at H are so adjusted in the uprights D as to allow an oscillation of the pieces D laterally, which is produced by moving the handles to which the upper ends of the uprights are attached in such manner as causes the handles to move their respective shovels whenever the handles are moved either to the right or the left, as occasion may require.

The pieces $b\ b$ are furnished with two sets of holes for the bolts at H, that the inclination or set of the plows on the uprights D may be changed at the will of the operator, and the pieces or uprights D are braced by the metallic braces $f f$ to the cross-piece G.

To the outer side of the pieces $c\ c$, near the rear end of them, is fastened, by suitable bolts, the uprights E E, each of which is furnished with a shovel, and is also braced to their respective pieces $c\ c$ by the metallic braces $e\ e$, which are to be furnished at their lower ends with screws and nuts, by use of which to vary the inclination or set of the plows on them, respectively.

The operation of this machine is as follows: When the corn or other product is young, and it is convenient to do so, the machine is placed over a row of corn or other product in such manner that as it passes it shall have two of its plows on one side of it and two on the other, and when from inadvertence or other cause any hill or hills in any row shall have been planted out of line and in such a position as that, if the inner plows were not moved laterally, there would be danger of cutting up or otherwise injuring such hills, then the operator, by pressing to the right or left on the handle of the plow that would appear to be likely to cut up or injury the hills planted out of line, will adapt the machine to its proper purpose; and when needful both plows, by a corresponding pressure upon their handles, may both of them be moved in the same direction, or by reverse pressures they may be made to move in opposite directions, as may be found to be necessary, while the whole machine is of such width as to permit the convenient use of it between any two rows of corn or other product.

Having thus stated my invention, what I claim therein as new, and desire to secure by Letters Patent, is—

The arrangement of the handles C C, the joints k k, the brackets F, and the uprights D D, for the purpose set forth, and as described.

In testimony of which invention I hereunto set my hand.

CYRUS DEBOLT.

Witnesses:
 MARTIN A. HOWELL, Jr.,
 GUSTAV KOCH.